Figure 1:
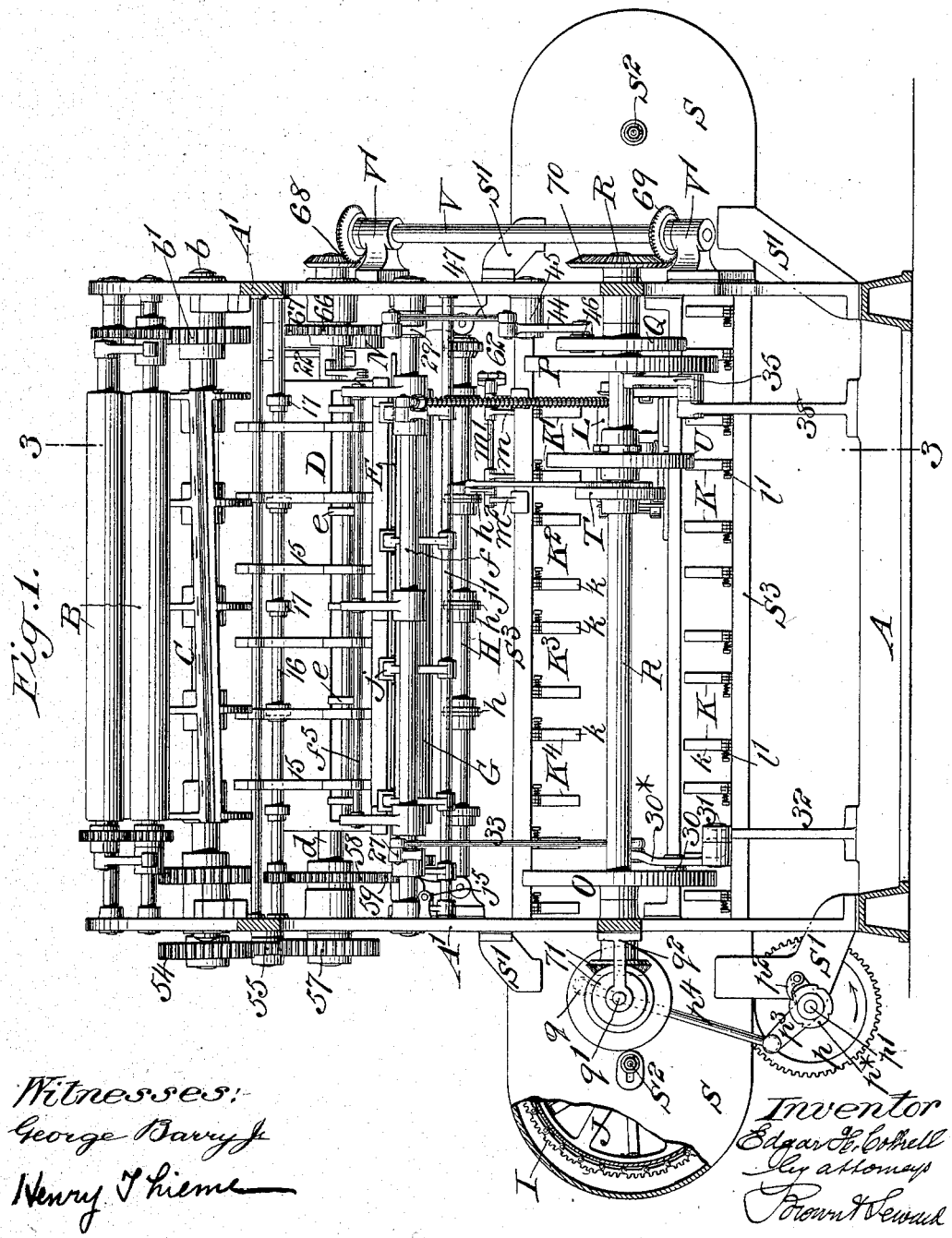

No. 749,362. PATENTED JAN. 12, 1904.
E. H. COTTRELL.
MACHINERY FOR CUTTING AND FOLDING PAPER OR OTHER FABRICS.
APPLICATION FILED DEC. 15, 1902.
NO MODEL. 7 SHEETS—SHEET 1.

Witnesses:
George Barry Jr
Henry Thieme

Inventor
Edgar H. Cottrell
by attorneys
Brown & Seward

No. 749,362. PATENTED JAN. 12, 1904.
E. H. COTTRELL.
MACHINERY FOR CUTTING AND FOLDING PAPER OR OTHER FABRICS.
APPLICATION FILED DEC. 15, 1902.
NO MODEL. 7 SHEETS—SHEET 2.
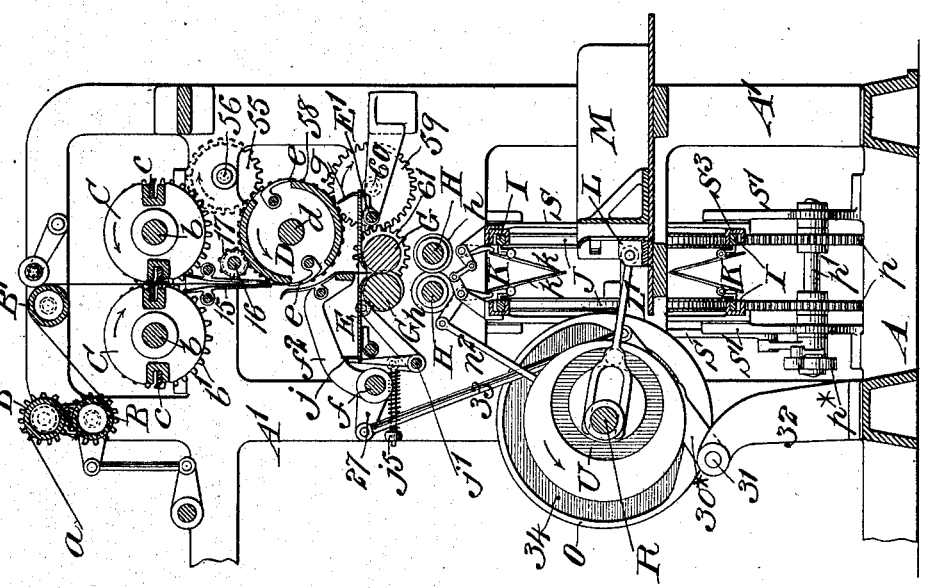
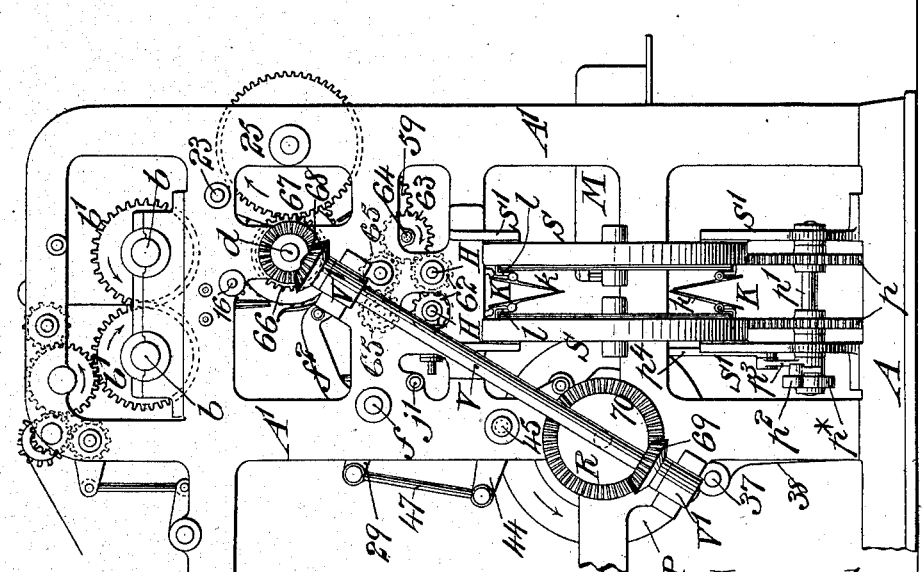
Witnesses:
George Barry Jr.
Henry Thieme
Inventor
Edgar H. Cottrell
by attorneys
Brown & Seward No. 749,362. PATENTED JAN. 12, 1904.
E. H. COTTRELL.
MACHINERY FOR CUTTING AND FOLDING PAPER OR OTHER FABRICS.
APPLICATION FILED DEC. 15, 1902.
NO MODEL. 7 SHEETS—SHEET 3.
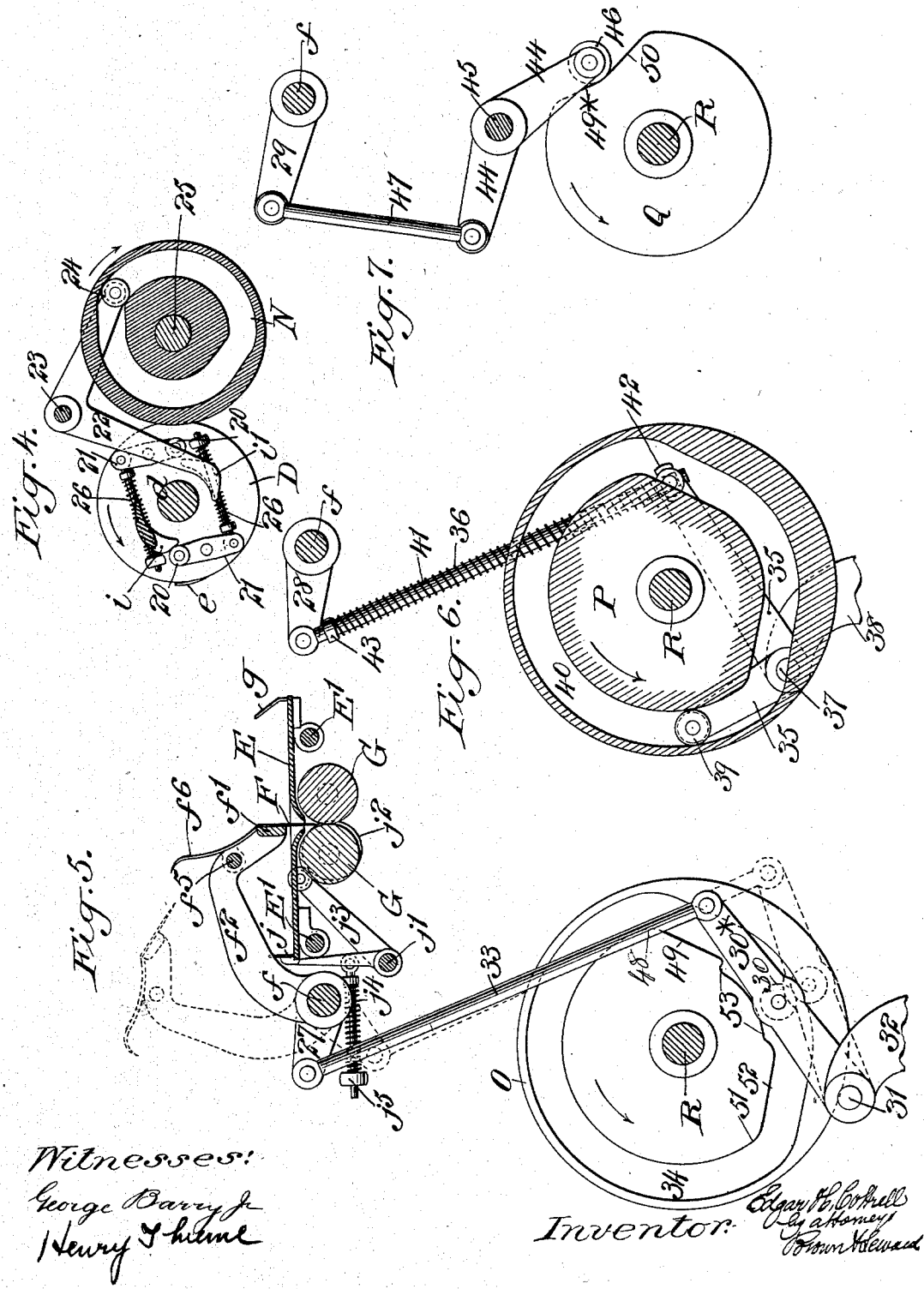
Witnesses:
George Barry Jr
Henry Thieme
Inventor:
Edgar H. Cottrell
by attorney No. 749,362. PATENTED JAN. 12, 1904.
E. H. COTTRELL.
MACHINERY FOR CUTTING AND FOLDING PAPER OR OTHER FABRICS.
APPLICATION FILED DEC. 15, 1902.
NO MODEL. 7 SHEETS—SHEET 4.
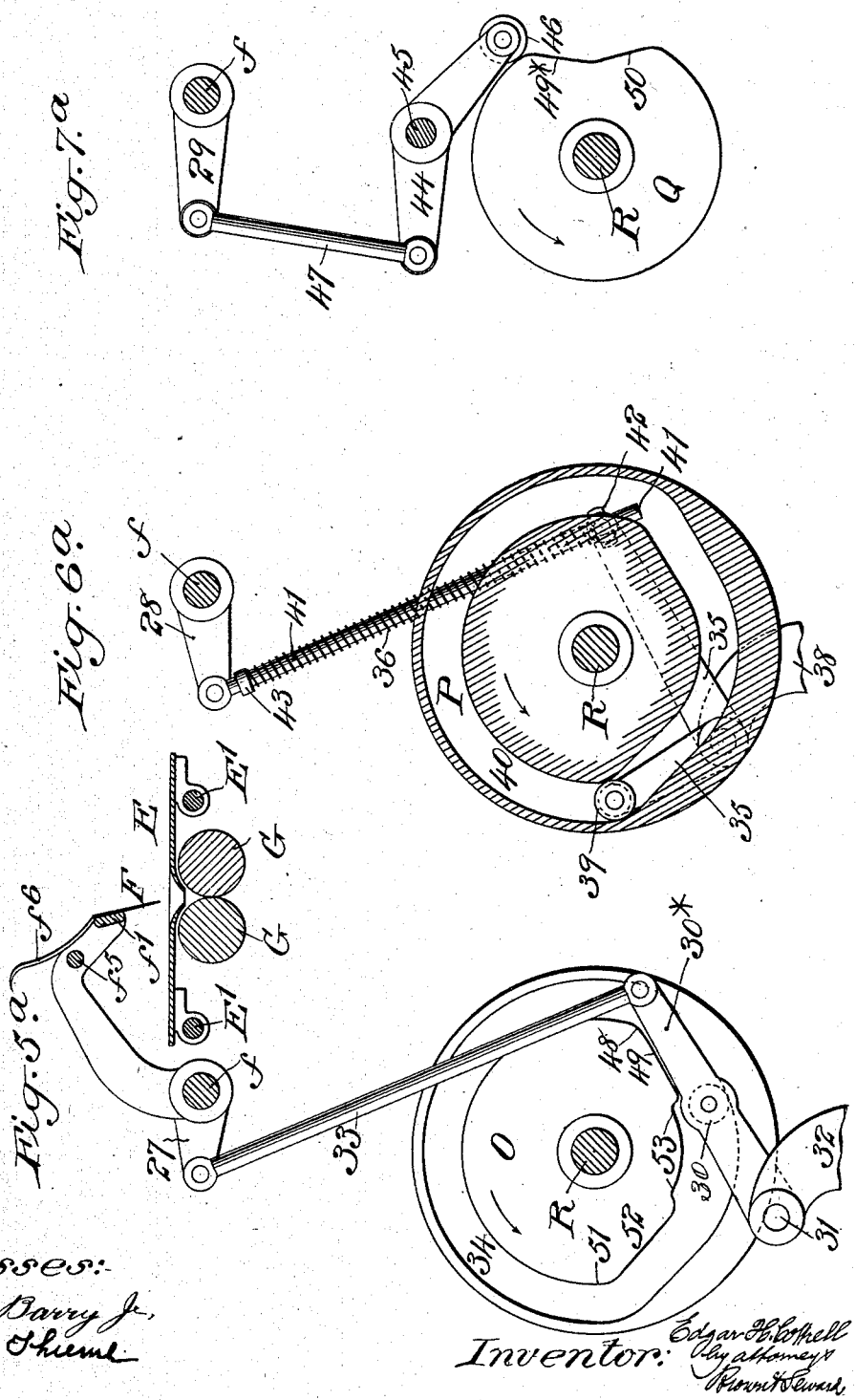
Witnesses:
George Barry Jr.
Henry Thieme
Inventor:
Edgar H. Cottrell
By attorneys
Brown & Seward

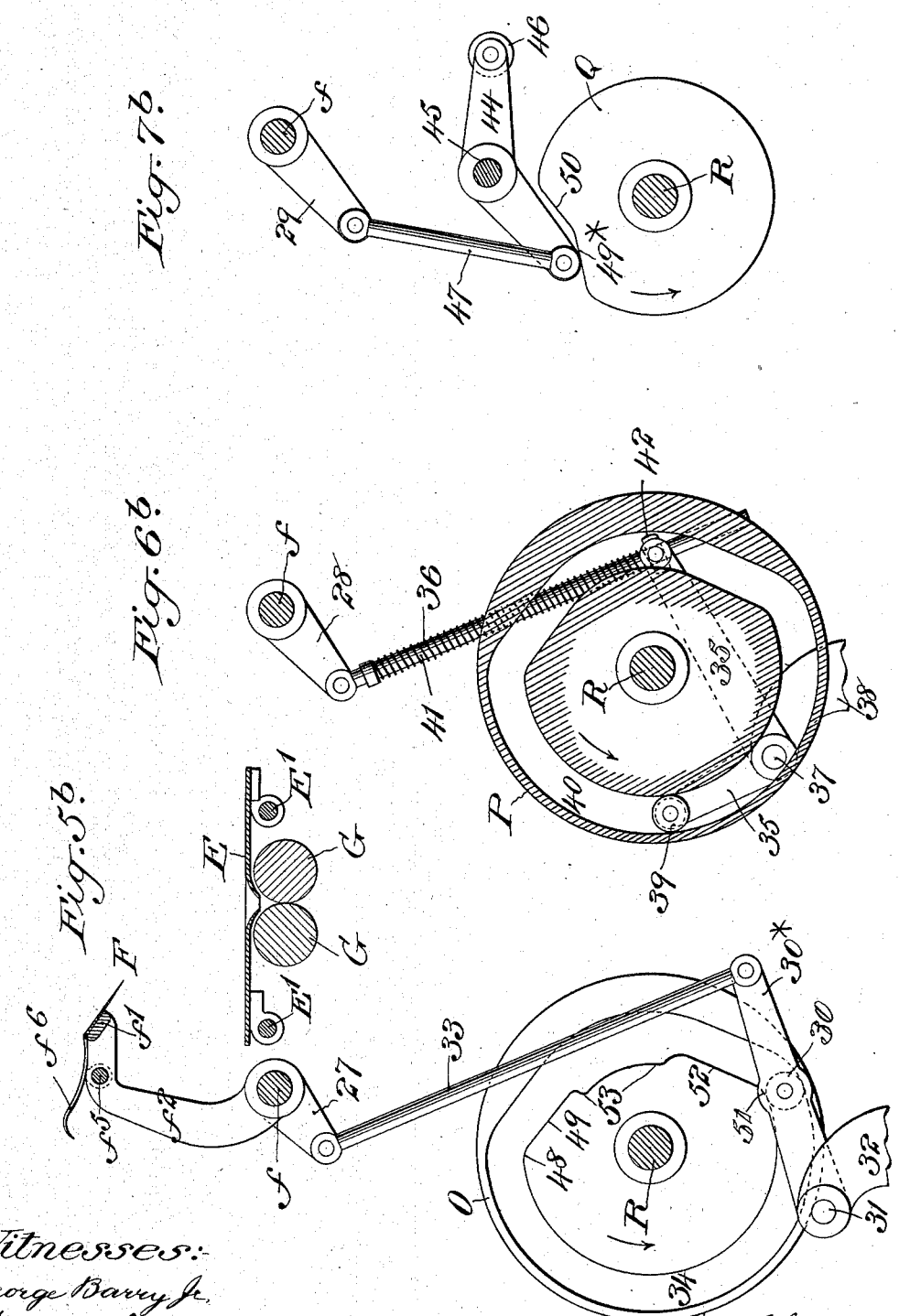

No. 749,362. PATENTED JAN. 12, 1904.
E. H. COTTRELL.
MACHINERY FOR CUTTING AND FOLDING PAPER OR OTHER FABRICS.
APPLICATION FILED DEC. 15, 1902.
NO MODEL. 7 SHEETS—SHEET 6.
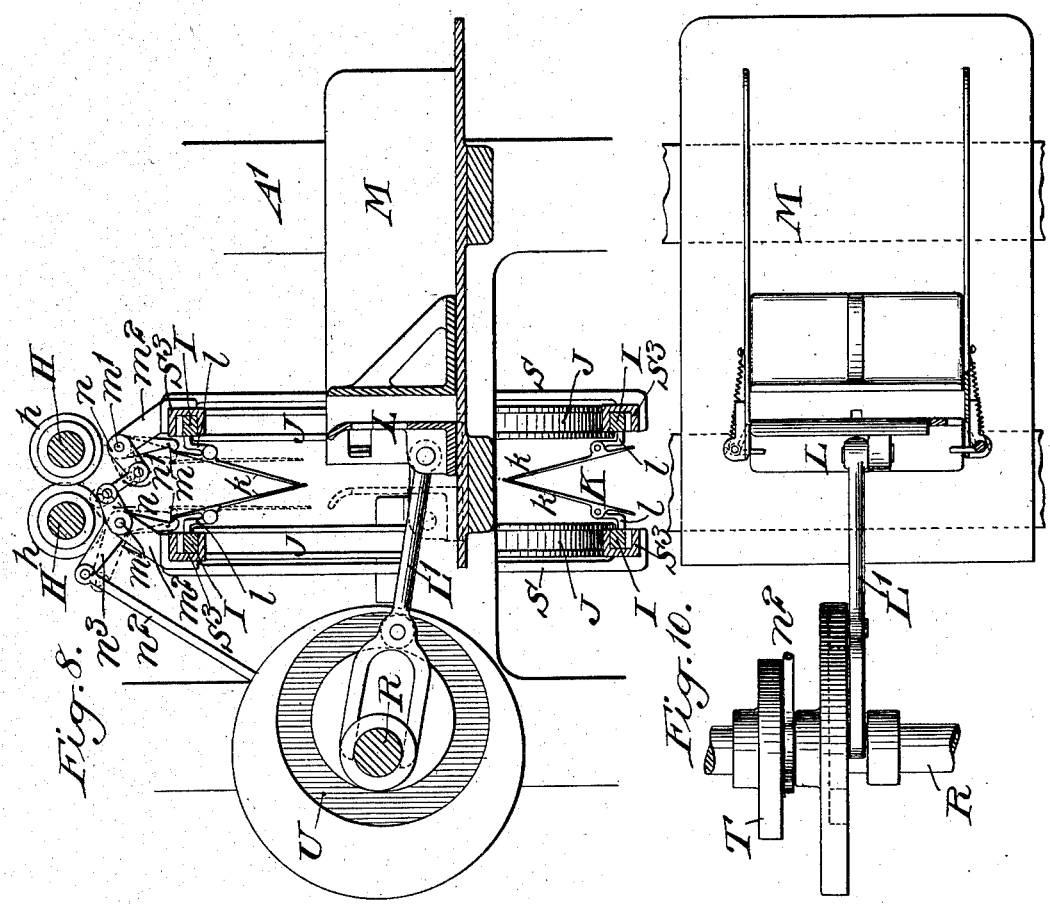
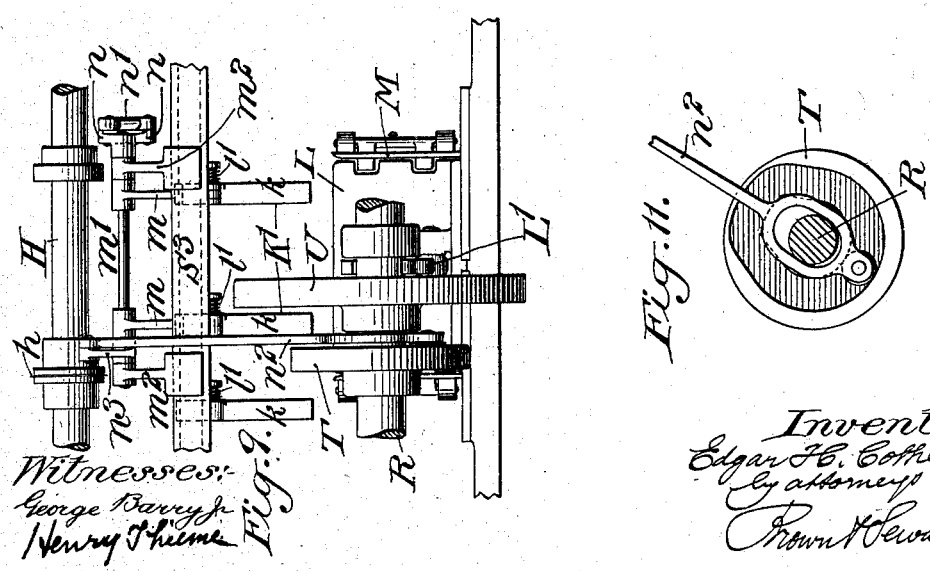

No. 749,362. PATENTED JAN. 12, 1904.
E. H. COTTRELL.
MACHINERY FOR CUTTING AND FOLDING PAPER OR OTHER FABRICS.
APPLICATION FILED DEC. 15, 1902.
NO MODEL. 7 SHEETS—SHEET 7.
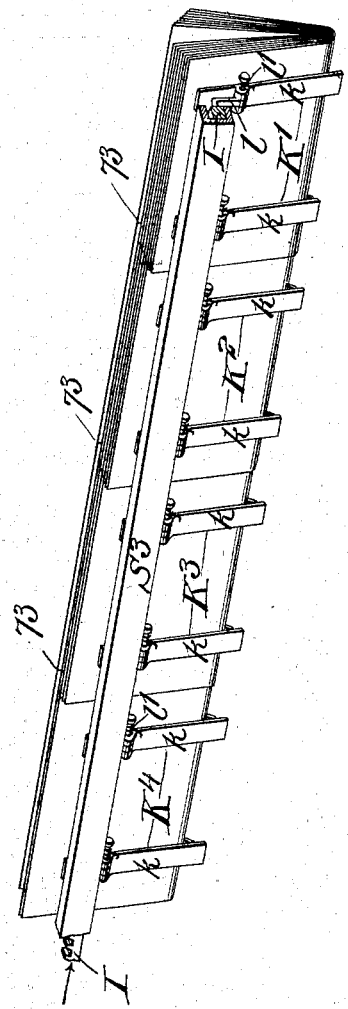
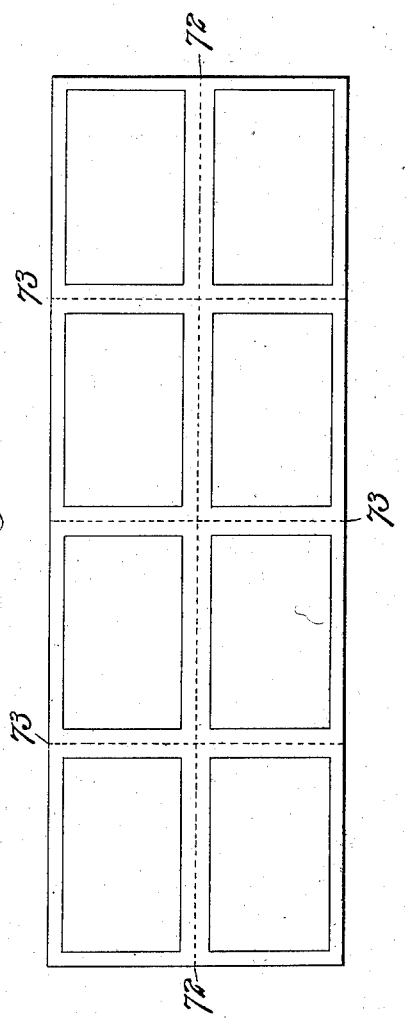
Witnesses:
George Barry Jr
Henry Thieme
Inventor:
Edgar H. Cottrell
by attorneys
Brown & Seward No. 749,362. Patented January 12, 1904.

UNITED STATES PATENT OFFICE.

EDGAR H. COTTRELL, OF STONINGTON, CONNECTICUT, ASSIGNOR TO C. B. COTTRELL & SONS COMPANY, OF NEW YORK, N. Y., AND STONINGTON, CONNECTICUT, A CORPORATION OF NEW JERSEY.

MACHINERY FOR CUTTING AND FOLDING PAPER OR OTHER FABRICS.

SPECIFICATION forming part of Letters Patent No. 749,362, dated January 12, 1904.

Application filed December 15, 1902. Serial No. 135,296. (No model.)

*To all whom it may concern:*

Be it known that I, EDGAR H. COTTRELL, a citizen of the United States, and a resident of Stonington, in the county of New London and State of Connecticut, have invented a new and useful Improvement in Machinery for Cutting and Folding Paper or other Fabrics, of which the following is a specification.

The cutting and folding machinery which constitutes this invention is more especially intended for use in connection with a perfecting printing-machine in which the printing of pages sufficient to make a signature is performed on a continuous web before cutting the latter into sheets.

Machinery embodying the invention in its entirety comprises a collecting cylinder or drum for collecting one upon another sheets cut transversely from the printed web and depositing these collections of sheets upon a folding table or support, a folder for folding the said collections of sheets parallel with the lines on which the sheets are cut from the web, a slitter for slitting the so-folded collections of sheets crosswise of their fold into smaller folded sheets, and a carrier provided with pockets within which the said smaller folded sheets are so inset together as to form signatures with open edges and from which the said signatures are delivered to a packer or any suitable receptacle.

The invention consists in the combinations hereinafter described and claimed, in which the said collecting cylinder or drum, folder, slitter, and carrier and some of their details constitute elements.

The invention is illustrated in the accompanying drawings, which represent cutting and folding machinery for producing a sixty-four page open-edged signature from two collections, each consisting of a couple of sixteen-page sheets.

Figure 1 is an elevation taken parallel with the collecting-cylinder and with the run of the carrier, part of the framing being omitted to expose the working parts of the machinery to view; Fig. 2, an elevation as viewed from the right of Fig. 1; Fig. 3, a transverse section in the line 3 3 of Fig. 1 as viewed from the right; Fig. 4, an end view of the collecting-cylinder and side view, partly in section, of its gripper-actuating mechanism; Fig. 5, a transverse section of the folder and side view of one of the cams and intermediate mechanisms for operating the same; Figs. 6 and 7, side views of other cams and intermediate mechanisms for operating the folder, showing them in positions corresponding with the position shown in Fig. 5. Figs. 5ª, 6ª, 7ª are views of the same parts shown in Figs. 5, 6, 7, respectively, showing said parts in corresponding relation with each other in positions different from those shown in Figs. 5, 6, 7. Figs. 5ᵇ, 6ᵇ, and 7ᵇ are views of the same parts shown in Figs. 5, 6, 7 and in Figs. 5ª, 6ª, 7ª, respectively, but in other corresponding relations with each other; Fig. 8, a transverse section of the slitter, the pocketed carrier, and a packer into which said carrier delivers the open-edged signatures; Fig. 9, a side view corresponding with Fig. 1 of the principal parts shown in Fig. 8; Fig. 10, a plan of the packer; Fig. 11, a side view of the cam for opening the pockets of the carrier; Fig. 12, a diagram of one of the sixteen-page sheets of which the collections made into signatures by this machine are composed; Fig. 13, a perspective view of a portion of the pocketed carrier with a train of sheets therein.

A A' designate the framing within which the several parts of the machinery constituting my invention are supported. This framing may constitute part of the framing of a perfecting printing-machine to which the said invention is an adjunct. In the upper part of this framing are feed-rollers B B', which receive the web $a$ and feed it to the cutter, which is represented as consisting of two rotary cutter-carriers C and attached cutting-blades $c$, the shafts $b$ of said carriers C running in suitable bearings in the framing and being geared together by gears $b'$. Below this cutter the collecting-cylinder D, furnished with grippers $e$, has its shaft $d$ running in suitable bearings in the framing. At some distance below the collecting-cylinder D there is supported in the framing on horizontal stationary bars E' the stationary slotted table E, upon which the sheets cut from the web by the cutter C c are deposited to be folded, the said table being of a length equal to or a little longer than the collecting-cylinder. The folder consists of a reciprocating folding-blade F and folding-rollers G, the said rollers running under the table in bearings in the framing, and the said blade being affixed to a bar $f'$, carried by the arms $f^2$ of a rock-shaft $f$, which is supported in bearings in the framing, the said rock-shaft and the length of the blade being parallel with the axis of the cylinder D. Below the folding-rollers is the rotary slitter, consisting of shearing-disks $h$, carried by two rotary shafts H, running in bearings in the framing, and below this slitter is the horizontal endless pocketed carrier, consisting principally of endless toothed racks or chains I, wheels J, carrying said racks or chains, and V-shaped pockets K K' K$^2$ K$^3$ K$^4$, carried by said racks or chains. Between the upper and lower runs of the said endless carrier there is a horizontally-reciprocating packer L, working in a packing box or trough M, supported on fixed bearers on the framing.

Between the cutter and the collecting-cylinder there are guides 15 to guide the end of the web and the sheets cut therefrom to the grippers $e$ of said cylinder, and beside these guides 15 there is, as shown in Figs. 1 and 3, a shaft 16, which runs in bearings in the framing and is geared, as hereinafter described, with the collecting-cylinder and which carries rollers 17 for holding the first sheet of every collection of two which is taken by either set of grippers $e$ to the cylinder in proper register, while the same set of grippers are open to take the second sheet.

There are two sets of cutting-blades $c$ on the cutter-carriers and two sets of grippers on the collecting-cylinder. The shafts of said carriers and that of said cylinder are geared together to make the same number of revolutions. Two sheets are cut by every revolution of the cutter and two taken by the collecting-cylinder during each revolution. The circumference of the collecting-cylinder is a little greater than the circle circumscribing the edges of the cutting-blades in order that there may be a sufficient space between succeeding sheets taken on the cylinder for either set of grippers to receive the front edges of one sheet without disturbing the tail of the preceding sheet taken by the other set. The distance between the cylinder and cutter is such and the grippers are so set that each set of grippers takes the end of the web before the corresponding cutter-blades sever the sheet from the web.

The grippers $e$ may be and are represented as of the kind commonly used on the cylinders of printing and folding machines, consisting of fingers attached to shafts running lengthwise through the cylinders and normally closed by springs 26, which are represented in Fig. 4, but need no description. As said grippers are intended to collect the sheets in couples and so deposit them on the folding-table, they have to be opened to receive a sheet during every revolution of the cylinder, but only opened to deposit the collections of couples on the folding-table during every other revolution of the cylinder. To provide for opening the grippers at the proper times, there are, as illustrated in Fig. 4, two cams $i\ i'$, against which run rollers 20 on levers 21, provided on the ends of their shafts outside of one end of the cylinder. The cam $i$ for opening the grippers to receive the sheets is secured fixedly to the inside of the contiguous side of the framing and is of course always in place and so will produce the opening of the grippers every time they pass it; but the cam $i'$ for opening the grippers for the deposit of the collected couples of sheets on the folding-table has to be moved in and out of range of the rollers 20, so that it is only in such range during every other passage by it of the grippers. To provide for this movement of the cam $i'$, it is formed on one end of a lever 22, which works on a fixed fulcrum 23, secured in or on the framing, and the other end of said lever is furnished with a friction-roller 24, running in a cam N, which is fitted loosely on a fixed stub-shaft 25, affixed to the framing and to which constant rotary motion is given, as hereinafter described, at such speed that it makes one revolution for every two of the collecting-cylinder.

Attached to one edge of the table E there are fixed sheet-stops $g$, against which the sheets deposited for folding are jogged to register on the table by joggers $j$, Figs. 3 and 5, at the opposite side of the latter. These joggers are carried by a rock-shaft $j'$, working in fixed bearings below the table and receiving the necessary movement from an eccentric-cam $j^2$ on the shaft of one of the folding-rollers G, the said cam acting on an arm $j^3$ of said rock-shaft to throw the joggers back from the table, and a spring $j^4$, applied between the said arm $j^3$ and a fixed stop $j^5$ on the framing, serving to throw them forward toward the table.

The rock-shaft $f$, which carries the folding-blade, is actuated and controlled by three cams O P Q on a rotary shaft R, which makes one revolution for every two of the collecting-cylinder. The cam O (shown in Figs. 5, 5$^a$, and 5$^b$) acts upon an arm 27 on said rock-shaft. The cam P (shown in Figs. 6, 6$^a$, and 6$^b$) acts upon an arm 28 on said rock-shaft, and the cam Q (shown in Figs. 7, 7$^a$, 7$^b$) acts upon an arm 29 on said rock-shaft. The cam O acts on the rock-shaft arm 27 through a roller 30 on a lever 30$^*$, Figs. 5, 5$^a$, and 5$^b$, which works upon a fixed fulcrum 31 on a stand 32, (see also Fig. 1,) erected on the bed-plate A and which is connected by a rod 33 with the said arm 27, said roller 30 running in the groove 34 of the said cam. The cam P acts on the rock-shaft arm 28 through an elbow-lever 35 and coil-spring 36, Figs. 6, 6ª, 6ᵇ. The said lever 35 has a fixed fulcrum 37 in another stand, 38, (see also Fig. 1,) erected on the bed-plate A, one end of said lever being furnished with a roller 39, which runs in the groove 40 of said cam P and the other end having the spring 36 applied between it and the rock-shaft arm 28 and having running through it a rod 41, which is connected with the rock-shaft arm 28 and which runs freely through an eyebolt 42 on the lever 35, the spring abutting between said eyebolt and a shoulder 43 on the upper part of the rod. The cam Q acts on the rock-shaft arm 29 through a lever 44, (see Figs. 7, 7ª, 7ᵇ,) which works on a fulcrum formed by a stud 45, (see also Fig. 1,) secured in one of the uprights A' of the framing, one arm of said lever being furnished with a roller 46, which runs on the periphery of said cam, and the other end being connected by a rod 47 with said rock-shaft arm 29.

The folding-blade remains stationary in its highest position (shown in Fig. 5ᵇ and in dotted outline in Fig. 5) while two collected couples of sheets are being deposited one upon another upon the folding-table, being held in that position by the cam O, while the roller 30 remains in the more than semicircular concentric portion 34 of the groove of said cam and until the point 48 of said cam passes said roller, when the said roller is caused to run down the incline 49 of the cam-groove and so give the rock-shaft $f$ the necessary movement to bring down the folding-blade gradually to a position in which its edge is just a little—say half an inch—above the table, as shown in Fig. 5ª. By this movement of the cam-shaft the cam-roller 46, which has been previously raised, as shown in Fig. 7ᵇ, is brought within range of the cam Q, as shown in Fig. 7ª, and the further movement of the rock-shaft $f$ to carry the folding-blade through the slot in the table and between the rollers G, as shown in Fig. 5, to make the fold, is produced and controlled by the spring 36 and cams P Q, the spring being so powerfully compressed by the action of the cam P on the lever 35 as to act very rapidly and with sufficient force on the arm 28 of the rock-shaft to carry the blade down through the slot in the table. The roller 46 is now at the bottom of the incline 49* of the cam Q, and the continued rotation of the cam-shaft R carries the cam-roller 46 up the short incline 50 of the cam Q, and so the said cam acts very rapidly through the lever 44, rod 47, and the arm 29 of the rock-shaft $f$ to draw back the folding-blade from the rollers G and the fold of the sheets and raise it to the position shown in Fig. 5ª just above the table. By this time the point 51 of the cam O has reached the roller 30 and the operation of raising the folding-blade to its highest position (shown in Fig. 5ᵇ) is continued by the action of the incline 52 of the cam O on the said roller and its lever 30*, the latter acting through the rod 33 on the arm 27 of the rock-shaft $f$.

In order that the cam O shall not have to do its work against the continued strong pressure of the spring 36, the cam P is so formed and the lever 35, upon which said cam acts and which carries the eyebolt 42, forming the lower bearing for the spring, is so arranged that when the lever 30*, upon which said cam O acts, is moving downward the said eyebolt-bearing is moving in the same direction, thus keeping the tension of the spring approximately uniform at all points in the operation. In order that the folding operation produced and controlled by the spring 36 and cam Q, as hereinbefore described, shall not be interfered with by the cam O, said cam O has its lowest part cut away, as shown at 53, to widen its groove, so that while said cam is in operation said roller 30 has no contact with said cam O.

By the operation above described of the three cams O P Q and the spring 36, above described, the effective action of the blade F, which takes place between the position shown in Fig. 5ª and that shown in bold outline in Fig. 5 and its return from the latter to the former position are performed very quickly during a small fraction (about one-twelfth) of a revolution of the cylinder D, and the said blade is kept out of the way of the sheets during their deposits upon the table.

For the purpose of keeping the loose tail-ends of the first sheets of the several collections upon the cylinder D from falling away from the said cylinder as the said sheets approach the table there is fixedly secured in the folder-arms above the bar $f'$ a rod $f^5$, which is parallel with the folding-blade and to which are affixed a suitable number of curved guards $f^6$, which when the folding-blade F is in or near the folding-table E come near the cylinder and conform themselves approximately thereto, as shown in Fig. 3.

The endless pocketed carrier, hereinbefore referred to by the letters I J K, is represented in Figs. 1, 2, 3, but more clearly in Fig. 8, which is on a larger scale. Its endless toothed racks or chains I, hereinafter referred to as "racks," of which there are two arranged parallel with each other and with the axis of the collecting-cylinder, are of a length somewhat greater than that of the table E, so that they extend beyond it. The wheels J, which support the said racks, run on fixed stud-shafts $S^2$, mounted in stationary parallel horizontal frames S, which are carried by brackets S' on the upright framing A', and the portions of the racks between said wheels run in horizontal guides $S^3$ in said frames. The pockets K K' K² K³ K⁴ of said carrier consist each, as shown in Figs. 2, 3, and 8, of pairs of hinged side members $k$, represented as fingers, one of each of said pairs being hinged to brackets $l$, carried by one of the racks I and its fellow being opposite to it and hinged to brackets $l$ on the other of said racks. To the hinges of said pockets are applied springs $l'$, (shown in Fig. 9,) which keep them normally closed—that is to say, with the lips which form their bottoms closed together, as shown in Figs. 2, 3, and 8 in full outline. In the example represented (see Fig. 1) there are two pairs of fingers $k$ to each pocket. The several pockets are so spaced on the endless racks that there are contained within the length of the folding-table and of the collecting-cylinder a number equal to the greatest number of smaller sheets, into which the sheets cut by the cutter C $c$ from the web that is ever intended to be cut by the slitter H. In the example represented there are, as shown in Fig. 1, four pockets within the said length to receive the four sets of folded sheets cut by the slitter H $h$, which in this case, it will be understood, has three pairs of shearing-disks $h$. (Represented in Fig. 1.) This endless pocketed carrier has an intermittent or step-by-step movement which takes place between the successive operations of the folding-blade, which operations take place during the intermissions in the movement of the carrier. The folding-rollers carry the folded sheets through the slitter H $h$, by which said sheets are cut crosswise of the fold into the desired number of smaller sheets and then deposit the said sheets into the carrier-pockets with their folds in the direction of the run of the carrier. The length of the movements of the carrier is equal to the length of its pockets and to the lengths into which the sheets are cut by the slitters. These movements may be given to the carrier by any suitable means. There are represented for this purpose in Figs. 1, 2, and 3 two spur-gears $p$ on a short horizontal shaft $p'$, which runs in bearings in the lower brackets S', the said gears gearing with the two toothed racks of the carrier, said shaft $p'$ receiving the necessary intermittent movement through a four-toothed ratchet-wheel $p^*$, provided on said shaft, and a pawl $p^2$, carried by a lever $p^3$, which is fitted to oscillate on said shaft and which is actuated through a rod $p^4$ on a crank $q$ on a shaft $q'$, which runs in bearings in brackets $q^2$ on the upright framing A'.

For the purpose of opening the bottoms of the pockets, as shown in dotted outline in Fig. 8, as they severally arrive and stop at the position of K' in Figs. 1 and 13 for the dropping of the collections of folded sheets therefrom into the packer there are tappets consisting of arms $m$, carried by rock-shafts $m'$, supported in bearings in stands $m^2$ on the straight portions S³ of the carrier-frames, one of said rock-shafts being on one and the other on the other of said frames, each of said rock-shafts carrying two of said tappets, so arranged that the upper ends of the fingers $k$ of the pockets in the upper run of the carrier come between and opposite them when the pockets arrive and stop in the position hereinbefore described to be opened. The two rock-shafts are provided each with an arm $n$, and the two arms $n$ are connected by a link $n'$, so that a movement toward or from the pocket given to one will be imparted to the other. For the purpose of giving the said tappets the necessary movement for opening the pockets, as shown in dotted outline in Fig. 8, to drop the folded collections of sheets therefrom into a suitable receptacle, which in the example represented is the packer-box M, there is provided on the rotary shaft R a cam T, Figs. 9, 10, 11, and there is yoked with this cam a rod $n^2$, connected with an arm $n^3$ on one of the rock-shafts $m'$.

The packer L and its trough M represented are of a well-known kind which serves as well as any other for the purpose of my invention, which so far as it relates to any packing device only depends upon the relation thereof to the pocketed carrier—that is to say, its position between the upper and lower runs of said carrier, as shown in Figs. 2, 3, and 8, and its position shown in Figs. 1 and 9 opposite to and under the pocket-opening devices $m\ m'$. The packer L is represented as arranged to make one movement back and forth for every movement of the carrier and as having such movement given to it by an eccentric U on the shaft R, acting through a yoke-rod L', connected with the packer, as shown in Figs. 3, 8, and 10.

The driving of the the shafts of the rotary cutter C $c$, collecting-cylinder D, folding-rollers G, and rotary slitter H $h$ and the driving of the cam N, cam-shaft R, and shaft $q'$ at the proper relative speeds may be effected in any suitable manner by properly-proportioned gearing. Let it be supposed, for example, that one of the cutter-shafts $b$ is the driver for all the rest and that it is driven by any suitable gearing from a rotary printing-machine to which this cutting and folding machinery is an appurtenance. A gear 54, Fig. 1, on the said cutter-shaft drives the collecting-cylinder through a loose gear 55, Figs. 1 and 3, on a stud 56 on the framing, the said gear 55 gearing with said gear 54 and with a gear 57 on the cylinder-shaft. The shafts of the folding-rollers, which are geared together, are driven from the shaft of the collecting-cylinder through a gear 58, Figs. 1 and 3, on the latter shaft and a gear 59, Figs. 1 and 3, loose on a stud 60 on the framing, the said gear 59 gearing with said gear 58 and with a gear 61 on one of the shafts of the folding-rollers G. The slitter-shafts H, which are geared together by gears 62, Figs. 1 and 2, are driven from one of the shafts of the folding-rollers through a loose gear 63, Fig. 2, on a stud 64, which is bracketed to the framing A', the said gear 63 gearing with one of the gears 65 on the folding-rollers and one of the gears 62 on the shafts H of the slitting-rollers. The cam N is driven from the shaft $d$ of the collecting-cylinder by a gear 66, Figs. 1 and 2, on said shaft, gearing with a gear 67, fastened to said cam. The cam-shaft R is driven from the shaft $d$ of the collecting-cylinder through a side shaft V, running in bearings in fixed brackets V' outside of the framing, the said shaft being geared by miter-gears 68 with said shaft $d$ and by bevel-gears 69 70 with the cam-shaft. The crank-shaft $q'$ for giving motion to the endless carrier receives constant rotary motion from the cam-shaft R through a pair of miter-gears 71.

The gearing above described is so proportioned that the cutters C $c$ and the collecting-cylinder rotating at the same speed, the cam N, the cam-shaft R and its cams, and the carrier-operating shaft $q'$ all make one revolution for every two of the cutters and collecting-cylinder. The speeds of the folding-rollers need not bear any precise relation to the speeds of the other shafts above mentioned, but must be sufficient for coöperation with the folding-blade and the deposit of the folded sheets in the carrier during the intermissions of the movement of the carrier. The speed of the slitter-shafts may correspond with that of the folding-rollers or be such as will produce their proper operation.

The several parts of the machinery and their relation to each other and their respective movements having been now fully explained, their operations in regular order in cutting sixteen-page sheets, such as are shown in Fig. 12, each of which may be the product of a quarter of a revolution of the cylinder of a perfecting printing-machine, and producing from such sheets open-edged signatures of sixty-four pages, such as are represented at the right-hand end of Fig. 13, will now be briefly recapitulated.

Four sheets cut successively from the web are taken the first and the third ones by one set of grippers $e$ to form one couple and the second and the fourth by the other set of said grippers to form another couple, and the two couples are deposited by said cylinder one after the other and one upon the other upon the folding-table, making a set of four sheets upon the table. The folding-blade, which has been held to its highest position during these two deposits, then descends, striking said sheets on the center line 72, Fig. 12, which is parallel with the edges formed by cutting from the web, and carrying the set of four through the slot in the table and between the folding-rollers, thus folding them together.

The folding-rollers carry the set of four folded sheets through the slitters, by which they are cut on the lines 73, Figs. 12 and 13, into four sets, each consisting of four shorter folded sheets of four pages, constituting a signature of sixteen pages. These signatures drop one into each of the four pockets K' K² K³ K⁴ of the carrier, which have been presented under the folder, and are there for the time stationary. While the carrier still remains stationary the foremost one, K', of the said pockets is opened, as hereinbefore described, and the signature which it contains is dropped therefrom into the packer. These operations are repeated in the intervals between successive movements of the carrier, each signature of sixteen pages being delivered from the slitter inset into its predecessor, as shown in Fig. 13, in which to avoid multiplicity of lines and for the sake of perspicuity each couple of sheets is indicated by a single line only. The first of these deliveries from the carrier consists of only one signature of sixteen pages, the second of one signature of thirty-two pages, the third of one signature of forty-eight pages, and the fourth of one signature of sixty-four pages. Of these signatures the first, second, and third may be thrown away or otherwise disposed of, as it is not until the fourth delivery that a complete signature of sixty-four pages is produced; but after this every delivery will consist of such complete signatures, and the train of sheets in the carrier ready for the delivery will appear as shown in the perspective view Fig. 13.

It will be readily understood by those skilled in the art how this machinery may be adapted for producing signatures of other numbers of pages than sixty-four, and it may be here mentioned that the example represented for producing sixty-four-page signatures from a full-width web would without any changes of its parts and operating in the same way produce signatures of forty-eight pages from a three-quarter-width web or thirty-two pages from a half-width web, &c.

The term "cylinder" as used in this specification is intended to include any rotary carrier of substantially cylindrical contour furnished with grippers for taking sheets.

What I claim as my invention is—

1. The combination of a folding-table, a rotary collecting-cylinder for collecting a plurality of sheets one at a time and one upon another and depositing the collection directly upon the table, and a reciprocating folding-blade coöperating with said table for folding the so deposited collection of sheets.

2. The combination of a folding-table, a rotary collecting-cylinder for making on its periphery collections each consisting of a plurality of sheets and depositing a plurality of such collections one upon another in a pile on said table, and a reciprocating folding-blade coöperating with said table for folding together the pile of so deposited sheets.

3. The combination of folding devices for folding together a plurality of sheets by one fold and a carrier which runs in the direction of the lines of the folds and into which the so folded sheets are deposited by said folding devices.

4. The combination with a folding-table and folding-rollers and a rotary carrier for depositing sheets one upon another on said table, a folding-blade coöperating with said folding-rollers for the folding of the so deposited sheets, and a cam-controlled spring for producing the operation of said blade during a small fractional portion of a revolution of said carrier.

5. The combination of a folding-table, a cutter for cutting sheets from a web, a rotary cylinder interposed between said table and cutter for taking the cut sheets directly from the cutter and depositing them upon said table, and a folding-blade coöperating with said table for folding the so deposited sheets.

6. The combination of a folding-table, a cutter for cutting sheets from a web, a rotary collecting-cylinder for collecting so cut sheets one at a time and one upon another and depositing the collection directly upon the table, and a reciprocating folding-blade coöperating with said table for folding the so cut and deposited sheets.

7. The combination of a folding-table, a cutter for cutting sheets from a web, a rotary cylinder interposed between said table and cutter for making on its periphery collections each consisting of a plurality of so cut sheets and depositing a plurality of such collections one upon another in a pile on said table, and a reciprocating folding-blade coöperating with said table for folding together the pile of so cut, collected and deposited sheets.

8. The combination of a cutter for cutting sheets from a web, a slotted folding-table, a rotary cylinder interposed between said cutter and table for taking so cut sheets from the cutter and depositing them one upon another upon said table, folding-rollers under said table, a reciprocating folding-blade coöperating with said table and rollers for folding so cut and deposited sheets on lines parallel with the lines on which they are cut from the web, and a slitter for slitting the so cut and folded sheets crosswise of the lines on which they were cut from the web and of the line of their fold.

9. The combination of a cutter for cutting sheets from a web, a slotted folding-table, a rotary cylinder interposed between said cutter and table for collecting a plurality of sheets one upon another and depositing the collection upon said table, folding-rollers under said table, a reciprocating folding-blade coöperating with said table and rollers for folding the so deposited collection of sheets on lines parallel with the lines on which they are cut from the web and a slitter for slitting the so cut and folded sheets crosswise of the lines of the first cut and the fold.

10. The combination of a cutter for cutting sheets from a web, a slotted folding-table, a rotary cylinder interposed between said cutter and table for making on its periphery collections each consisting of a plurality of sheets and depositing a plurality of such collections one upon another in a pile on said table, folding-rollers under said table, a reciprocating folding-blade coöperating with said table and rollers for folding the so deposited plurality of collections one within another on a line parallel with the lines on which the sheets were cut from the web, and a slitter for slitting the so folded pluralities of collections crosswise of the first cut and of the fold.

11. The combination in and with an endless sheet-carrier, of two endless moving racks, members attached to said racks and forming pockets, springs applied to said members for closing the bottoms of the pockets and cam-actuated mechanism outside of the carrier and operating on said members for opening the bottoms of the pockets.

12. The combination with an endless carrier comprising two endless racks and members hinged thereto and forming pockets, of two rock-shafts one for each rack arranged parallel with the racks, stationary bearings for said rock-shafts, tappets on said rock-shafts for operating on said members to produce the opening of the bottoms of said pockets, and connections between the two rock-shafts whereby the tappets of the two operate together.

13. The combination with a folder and a horizontally-running endless pocketed carrier for the reception of folded sheets from the folder, of a receptacle arranged between the upper and lower runs of said carrier for the reception of the folded sheets from the pockets in the upper run of said carrier.

14. The combination with a folder and a horizontally-running endless pocketed carrier for the reception of folded sheets from the folder, of a packing-trough arranged between the upper and lower runs of said carrier for the reception of sheets therefrom, and a packer moving in said trough in a direction transverse to that of the movement of said carrier.

15. The combination with a folder for folding together a collection of sheets and a slitter for slitting the so folded collection crosswise of the fold into shorter collections of sheets, of an endless carrier running in a direction parallel with the line of the fold of the sheets and having separate pockets for the reception of said shorter collections of sheets.

16. The combination with a folder for folding together a collection of sheets and a slitter for slitting the so folded collection crosswise of the fold into shorter collections of sheets, of an endless carrier running in a direction parallel with the line of the fold and having separate pockets for- the reception of said shorter collections from the folder and slitter, and means for giving to said carrier stepby-step movements equal to the length of said separate pockets whereby a plurality of said shorter collections are inset one within another in the pockets.

17. The combination with a folder for folding together a collection of sheets and a slitter for slitting the so folded collection crosswise of the fold into shorter collections of sheets, of an endless carrier running in a direction parallel with the line of the fold and having separate pockets for the reception of said shorter collections from the folder and slitter, means for giving said carrier step-by-step movements equal to the length of said separate pockets whereby a plurality of said shorter collections are inset one within another in the pockets to form signatures, and means for opening the bottoms of the pockets for the discharge therefrom of the so formed signatures.

18. The combination of a folding table, a rotary cylinder for making on its periphery a plurality of collections each consisting of a plurality of sheets and depositing a plurality of such collections one upon another in a pile on said table, folding-rollers, a reciprocating folding-blade coöperating with said rollers for folding the so deposited plurality of collections one within another, a slitter for slitting the so folded pluralities of collections crosswise of the fold into shorter collections of sheets, an endless carrier having separate pockets for the reception of said shorter collections, means for giving said carrier step-by-step movements whereby a plurality of said shorter collections are inset one within another to form a signature.

19. The combination with folding-rollers for first folding together a plurality of sheets into a signature by one fold and for afterward by a repetition of said operation folding together in the same manner a second plurality of sheets into a second signature and insetting said second signature in the first one, of a carrier running in the direction of the fold for the reception of the folded and inset signatures.

In testimony that I claim the foregoing as my invention I have signed my name, in presence of two witnesses, this 11th day of December, 1902.

EDGAR H. COTTRELL.

Witnesses:
   FREDK. HAYNES,
   GEORGE BANY, Jr.